(12) United States Patent
Sakai et al.

(10) Patent No.: US 11,143,741 B2
(45) Date of Patent: Oct. 12, 2021

(54) RADAR SYSTEM

(71) Applicants: DENSO CORPORATION, Kariya (JP); SOKEN, INC., Nisshin (JP)

(72) Inventors: Toshiya Sakai, Nisshin (JP); Kazumasa Sakurai, Nisshin (JP); Asahi Kondo, Kariya (JP)

(73) Assignees: DENSO CORPORATION, Kariya (JP); SOKEN, INC., Nisshin (JP)

( * ) Notice: Subject to any disclaimer, the term of this patent is extended or adjusted under 35 U.S.C. 154(b) by 0 days.

(21) Appl. No.: 16/654,395

(22) Filed: Oct. 16, 2019

(65) Prior Publication Data

US 2020/0049794 A1 Feb. 13, 2020

Related U.S. Application Data

(63) Continuation of application No. PCT/JP2018/015389, filed on Apr. 12, 2018.

(30) Foreign Application Priority Data

Apr. 18, 2017 (JP) .............................. JP2017-081949

(51) Int. Cl.
*G01S 7/03* (2006.01)
*G01S 13/04* (2006.01)
(Continued)

(52) U.S. Cl.
CPC .............. *G01S 7/032* (2013.01); *G01S 13/04* (2013.01); *H01Q 1/42* (2013.01); *H01Q 3/36* (2013.01); *H01Q 21/061* (2013.01)

(58) Field of Classification Search
CPC .................................. G01S 7/032; G01S 13/04
See application file for complete search history.

(56) References Cited

U.S. PATENT DOCUMENTS

| 2008/0233367 A1* | 9/2008 | Maeda | H01Q 1/3233 |
| | | | 428/201 |
| 2015/0123838 A1* | 5/2015 | Shi | H01Q 21/0075 |
| | | | 342/70 |

(Continued)

FOREIGN PATENT DOCUMENTS

| JP | 2004-200895 A | 7/2004 |
| JP | 2009-284287 A | 12/2009 |

(Continued)

*Primary Examiner* — Marcus E Windrich
(74) *Attorney, Agent, or Firm* — Maschoff Brennan

(57) ABSTRACT

A radar system detects an object using radar waves and includes an antenna surface and a cover part. The antenna surface is provided with at least one array antenna arranged on a collinear arrangement straight line. The cover part covers the front of an antenna of the array antenna, where the front of the antenna is the side away from which radar waves are radiated with respect to the antenna surface as a boundary. The at least one array antenna is provided with at least one unit antenna where a plurality of antenna elements that radiate radar waves of the same phase are arranged in the same direction as the arrangement straight line. The unit antenna is arranged in a direction perpendicular to the arrangement straight line along the antenna surface. The cover part is configured such that the incidence angle of the radar waves is equal to or less than a Brewster angle.

6 Claims, 8 Drawing Sheets

(51) Int. Cl.
    *H01Q 1/42*     (2006.01)
    *H01Q 3/36*     (2006.01)
    *H01Q 21/06*     (2006.01)

(56) References Cited

U.S. PATENT DOCUMENTS

| | | | |
|---|---|---|---|
| 2016/0093944 A1 | 3/2016 | Kamo | |
| 2017/0346177 A1* | 11/2017 | Nagata | H01Q 19/06 |
| 2018/0159207 A1* | 6/2018 | Shurish | H01Q 1/422 |

FOREIGN PATENT DOCUMENTS

| | | |
|---|---|---|
| JP | 2015-081903 A | 4/2015 |
| JP | 2016-070916 A | 5/2016 |
| WO | 2016/136927 A1 | 9/2016 |

\* cited by examiner

ANTENNA CENTER PLANE

RADAR SYSTEM

CROSS-REFERENCE TO RELATED APPLICATIONS

The present application is a continuation application of International Application No. PCT/JP2018/015389, filed Apr. 12, 2018, which claims priority to Japanese Patent Application No. 2017-81949 filed Apr. 18, 2017. The contents of these applications are incorporated herein by reference in their entirety.

BACKGROUND

Technical Field

The present disclosure relates to a radar system that detects an object using radar waves.

Related Art

Related techniques include a radome that cancels reflected waves by the shape of the radome, and suppresses reception of reflected waves by the antenna. The shape of the radome is a pyramid projecting in the direction away from the antenna surface.

SUMMARY

One aspect of the present disclosure provides a radar system that detects an object using radar waves, which includes an antenna surface and a cover part. The antenna surface is provided with at least one array antenna arranged on a collinear arrangement straight line. The cover part covers the front of an antenna of the array antenna, where the front of the antenna is the side away from which radar waves are radiated with respect to the antenna surface as a boundary. Each of the at least one array antenna is provided with at least one unit antenna where a plurality of antenna elements that radiate radar waves of the same phase are arranged in the same direction as the arrangement straight line. The unit antenna is arranged in a direction perpendicular to the arrangement straight line along the antenna surface. An imaginary plane that is on the same plane as the arrangement straight line and is perpendicular to the antenna surface is set to be an antenna center plane, and in the antenna cross-section that is perpendicular to the antenna center plane, the position where the antenna center plane intersects the antenna surface is set to be the antenna center. An arbitrary point on a cover inner surface which is a surface of the cover part facing the antenna surface, which is a point of incidence of the radar waves is set to be an incidence point, and an angle at the incidence point between a normal line to a cover inner surface at the incidence point and an imaginary line connecting the incidence point and the antenna center is set to be an incidence angle. The cover part is configured such that the incidence angle is equal to or less than the Brewster angle.

DESCRIPTION OF THE EMBODIMENTS

Figure 1:
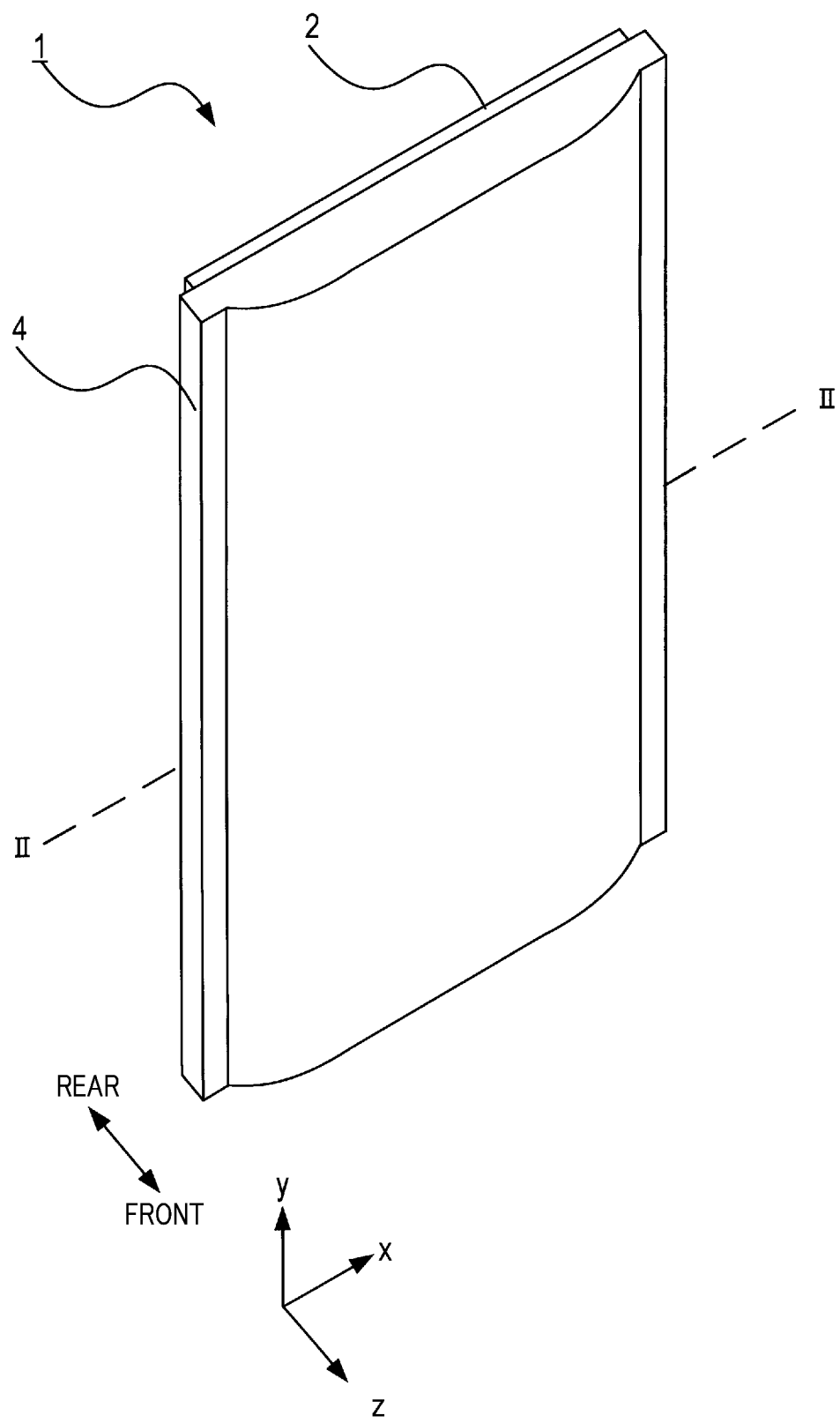
FIG. 1 is a perspective view of a radar system according to a first embodiment.

JP-A-2009-284287 discloses a radome which cancels reflected waves by the shape of the radome, and suppresses reception of reflected waves by the antenna. The shape of the radome is a pyramid projecting in the direction away from the antenna surface.

That is, the distance in the perpendicular direction between the antenna surface and the radome becomes larger as the location of measurement is closer to the center of the antenna surface compared to that at an edge portion of the antenna surface. The difference in the distance induces differences in the phases of the reflected waves reflected by the radome, and reflected waves of different phases are combined. Thereby, these reflected waves are canceled, and it is possible to suppress reception of reflected waves, reflected by the radome by the antenna as compared to the case where the shape of the radome is configured to be parallel to the antenna surface. As a result, it is possible to suppress the possibility that the radar system induces misdetection and reduction of sensitivity.

However, as a result of detailed investigation by the inventors, it was found that such a method of canceling reflected waves by the shape of the radome and suppressing reception of reflected waves by the antenna would depend on the incidence angle of waves entering the radome from the antenna surface. Therefore, there is an orientation where reflected waves are not canceled, which poses a problem of deteriorating sensitivity in the orientation.

It is thus desired to provide a technique of improving detection accuracy by suppressing deterioration of sensitivity of a radar system.

An exemplary embodiment of the present disclosure provides a radar system that detects an object using radar waves, which includes an antenna surface and a cover part.

The antenna surface is provided with at least one array antenna arranged on a collinear arrangement straight line. The cover part covers the front of an antenna of the array antenna, where the front of the antenna is the side away from which radar waves are radiated with respect to the antenna surface as a boundary. Each of the at least one array antenna is provided with at least one unit antenna where a plurality of antenna elements that radiate radar waves of the same phase are arranged in the same direction as the arrangement straight line. The unit antenna is arranged in a direction perpendicular to the arrangement straight line along the antenna surface. An imaginary plane that is on the same plane as the arrangement straight line and is perpendicular to the antenna surface is set to be an antenna center plane, and in the antenna cross-section that is perpendicular to the antenna center plane, the position where the antenna center plane intersects the antenna surface is set to be the antenna center. Moreover, an arbitrary point on a cover inner surface which is a surface of the cover part facing the antenna surface, which is a point of incidence of the radar waves is set to be an incidence point, and an angle at the incidence point between a normal line to a cover inner surface at the incidence point and an imaginary line connecting the incidence point and the antenna center is set to be an incidence angle. The cover part is configured such that the incidence angle is equal to or less than the Brewster angle.

According to such configuration, the detection accuracy can be improved by suppressing deterioration of sensitivity of the radar system.

Embodiments of the present disclosure shall be hereinafter described with reference to the drawings.

1. First Embodiment

[Configuration]

A radar system 1 of the present embodiment radiates radar waves and receives reflected waves from an object that reflected the radar waves. The radar waves are radio waves having a predetermined frequency, for example, millimeter waves.

Figure 2:
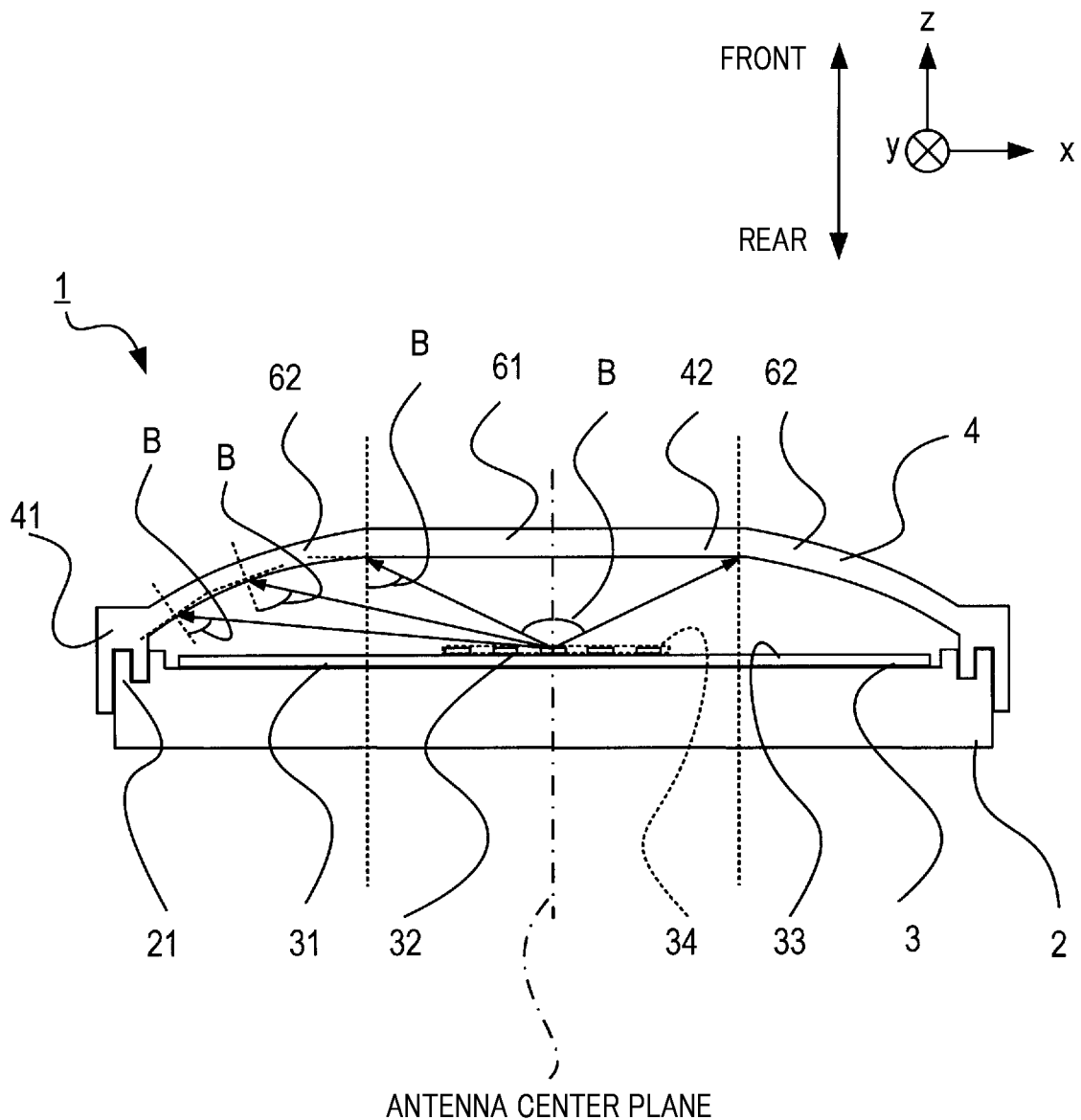
FIG. 2 is a cross-sectional view showing an antenna cross-section along line II-II in FIG. 1 of the radar system.

As shown in FIGS. 1 and 2, the radar system 1 is provided with a housing 2, an element part 3, and a cover part 4.

The housing 2 accommodates a radar main body that detects object(s) present in the surroundings using the radar system 1. The housing 2 has a fitting part 21 having an uneven shape in the peripheral part, and the housing 2 and the cover part 4 are fixed to each other by a fitting part 21. Further, the radar main body is provided with a transmission and reception circuit that transmits and receives radar waves and reflected waves via the element part 3, signal processing part that processes signals received by the transmission and reception circuit and obtains information on object(s) including at least distance(s) to the object(s) that reflected radar waves.

Figure 3:
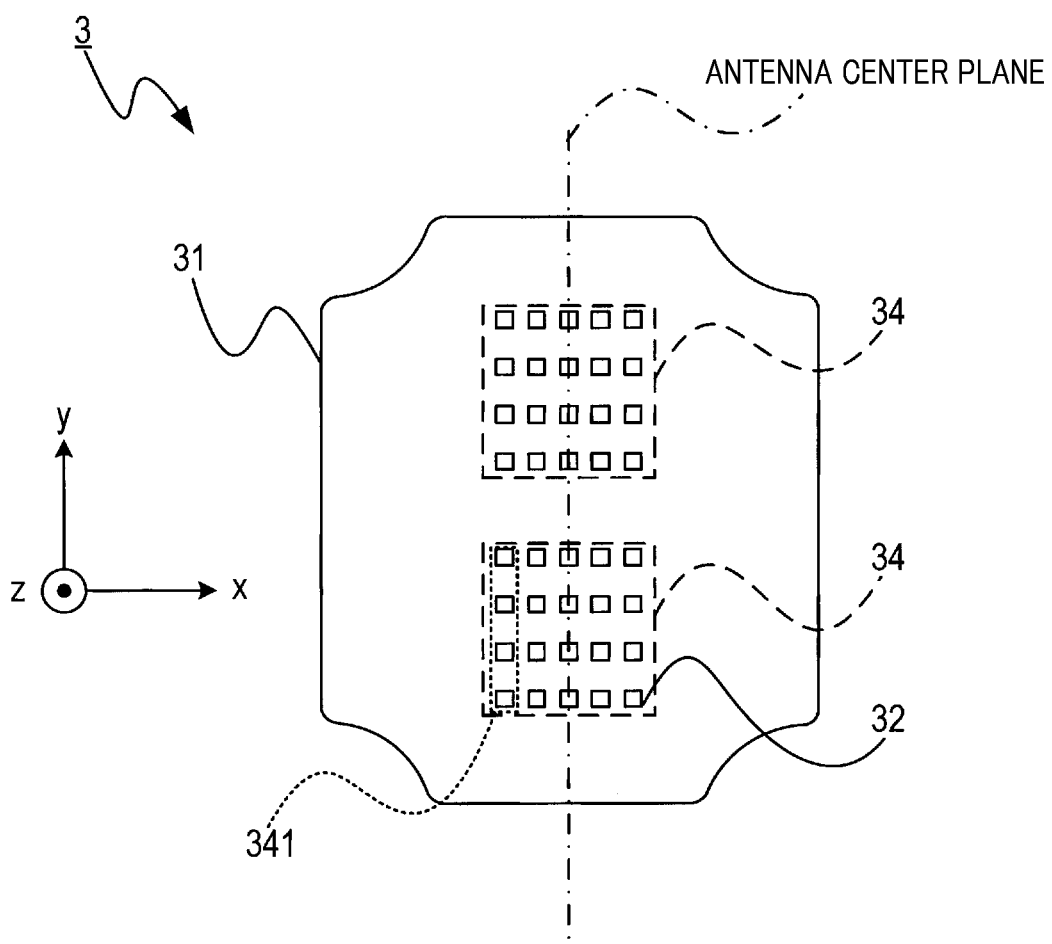
FIG. 3 is a view showing a configuration of the radar system as observed from the direction facing the antenna surface.

The element part 3 is provided with an antenna substrate 31 as shown in FIG. 3. The shape of the antenna substrate 31 is rectangular. Here, of the two pairs of opposing sides constituting the antenna substrate 31, the longer pair of sides may be referred to as a long side, and the shorter pair of sides may be referred to as a short side. The antenna substrate 31, as shown in FIG. 3 for example, may have a shape having corner portions cut off.

A coordinate axis perpendicular to the plane of the antenna substrate 31 is set as a z-axis, and coordinate axes perpendicular to the z-axis are set as an x-axis and a y-axis. Moreover, the x-axis and the y-axis are perpendicular to each other, and the short side direction of the antenna substrate 31 is set as the x-axis and the long side direction is set as the y-axis. Hereinafter, the x-axis direction may be referred to as the antenna polarized wave direction, and the y-axis direction may be referred to as the depth direction. Moreover, the positive direction of the z-axis, that is, the direction in which radio waves are radiated may be referred to as the front, and the negative direction of the z-axis may be referred to as the rear.

Moreover, in the antenna substrate 31, two array antennas 34 are formed on one side thereof for transmitting and receiving radio waves. Centers of the two array antennas 34 in the x-axis direction are set as antenna centers.

The array antennas 34 are arranged such that the centers of the antennas are on the same straight line in the same direction as the y-axis. The straight line is hereinafter referred to as an arrangement straight line. Moreover, as shown in FIG. 2, the plane of the antenna substrate 31 on which the array antennas 34 are formed is referred to as an antenna surface 33. Here, with respect to the antenna surface 33 as a boundary, the side away from which the radar waves are radiated is set as the front of the antenna, and the opposite side is set as the rear of the antenna.

Moreover, the surface of the antenna substrate 31 on the opposite side of the antenna surface 33 is fixed to the housing 2, and the housing 2 acts as a ground. An imaginary plane that is parallel to the yz-plane and that passes through the antenna centers is set as an antenna center plane. That is, the antenna center plane is a same plane as the plane that the arrangement straight line is on, and is perpendicular to the antenna surface.

As shown in FIG. 3, the two array antennas 34 formed at the center in the short side direction of the antenna substrate 31 have the same configuration. One of the two array antennas 34 is used as a transmitting antenna, and the other is used as a receiving antenna. Each of the array antennas 34 is provided with a plurality of antenna elements 32. A plurality of antenna elements 32 are two-dimensionally arranged along the x-axis direction and the y-axis direction with respect to the antenna substrate 31. A plurality of antenna elements 32 arranged in one row along the y-axis direction, namely the depth direction, constitute one unit antenna 341 each. That is, in the unit antenna 341, the plurality of antenna elements 32 are arranged in the same direction as the arrangement straight line. The array antenna 34 has a structure where five unit antennas 341 are arranged along the x-axis direction. Moreover, the plurality of unit antennas 341 radiate radar waves of the same phase for each unit antenna 341. Hereinafter, the unit antennas 341 constituting the array antenna 34 may be referred to as a channel 1 (ch1) antenna to a channel 5 (ch5) antenna in ascending order of the x-coordinate. The cover part 4 is formed of a dielectric that is transparent to radio waves, transmitted and received in the element part 3, and allows them to pass therethrough with low loss. Specifically, the relative dielectric constant $\varepsilon r$ of the cover part 4 is 3.6. Further, when the cover part 4 is fixed to the housing 2, it has a symmetrical shape with respect to the antenna center plane. The cover part 4 is provided with a fixing part 41 and a transparent part 42, and the fixing part 41 is provided at an end of the transparent part 42.

As shown in FIG. 2 showing an antenna cross-section, the fixing part 41 has an uneven shape. The cover part 4 and the housing 2 are fixed to each other at predetermined positions by fitting the uneven shape of the fixing part 41 and the uneven shape of the fitting part 21. The cover part 4 is fixed to the housing 2 to form a space for housing the element part 3 together with the housing 2 and to protect the element part 3. Here, among the surfaces constituting the cover part 4, the surface facing the antenna surface 33 may be referred to as a cover inner surface.

The thickness of the transparent part 42 is formed to be homogeneous, and to be half of the effective wavelength at the cover part 4 with respect to the frequency used in the radar waves radiated from the element part 3. Here, the thickness of the transparent part 42 may be referred to as a cover thickness.

The central part of the transparent part 42 has a planar shape parallel to the antenna surface 33, and the part having the planar shape may be referred to as a planar part 61. When the cover part 4 is fixed to the housing 2, the range of the planar part 61 is a range overlapping the range obtained by expanding the adjustment angle in the x-axis direction with respect to the antenna center plane at the antenna center. In the present embodiment, the adjustment angle is set to a Brewster angle B. The Brewster angle B is an incidence angle where the reflectance of horizontally polarized waves is zero at the interface between materials having different refractive indices. Here, the incidence angle is represented by an angle between a normal line at an incidence point that is a point that radar waves enter the cover inner surface in an antenna cross-section, and a straight line connecting the incidence point and the antenna center.

On the other hand, parts other than the central part of the transparent part 42 has a curved surface shape, and the parts other than the central part may be referred to as an adjustment part 62. The curved surface shape of the adjustment part 62 is a shape where the incidence angle at an arbitrary point is the Brewster angle B in the xz-plane passing through the arbitrary point on the cover inner surface of the adjustment part 62.

[Operation]

As described in detail above, in the cover inner surface of the planar part 61, the incidence angle of the radar waves radiated from the array antenna 34 is equal to or less than the Brewster angle B. On the other hand, in the cover inner surface of the adjustment part 62, the incidence angle of the radar waves radiated from the array antenna 34 is the Brewster angle B.

Figure 4:
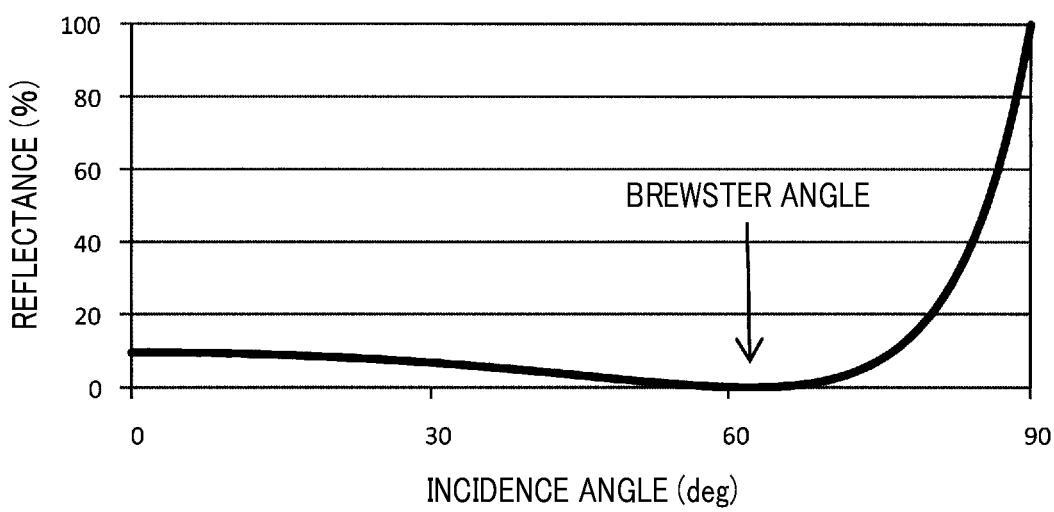
FIG. 4 is a graph showing reflectance of horizontally polarized waves with respect to the incidence angle to the cover part.

As shown in FIG. 4, the relationship between the incidence angle and the reflectance of the horizontally polarized waves of the radar waves when the relative dielectric constant εr of the cover part 4 is 3.6, is that the reflectance is less than 20% when the incidence angle is in the range from 0° to the Brewster angle B, decreases as the incidence angle increases, and is 0% when the incidence angle is at the Brewster angle B.

On the other hand, the reflectance of the horizontally polarized waves in the range where the incident angle is equal to or greater than the Brewster angle B sharply increases as the incidence angle increases compared to the amount of decrease in the reflectance of the horizontally polarized waves associated with the increase in the incidence angle in the range of less than the Brewster angle B, and when the incidence angle is 90°, the reflectance of the horizontally polarized waves is about 100%.

That is, according to the radar system 1 of the present embodiment, the incidence angle of the radar waves entering the transparent part 42 at the transparent part 42 is equal to or less than the Brewster angle B, and therefore the reflectance of the horizontally polarized waves of the radar waves in the cover inner surface of the transparent part 42 is less than 20%.

[Effects]

According to the first embodiment described in detail above, the following effects are produced.

(1) Since the reflectance of the horizontally polarized waves of the radar waves can be suppressed by the cover part 4, the reduction of sensitivity of the radar system due to the reflection of the horizontally polarized waves can be suppressed, and the detection accuracy can be improved.

Figure 5:
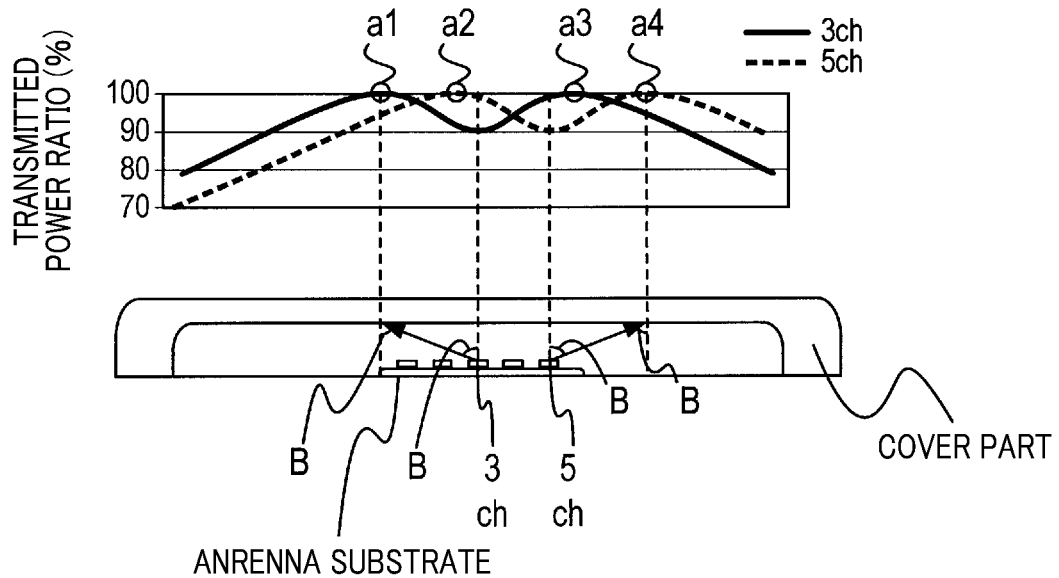
FIG. 5 is a diagram showing theoretically calculated transmittance in a rectangular cover part.
Figure 6:
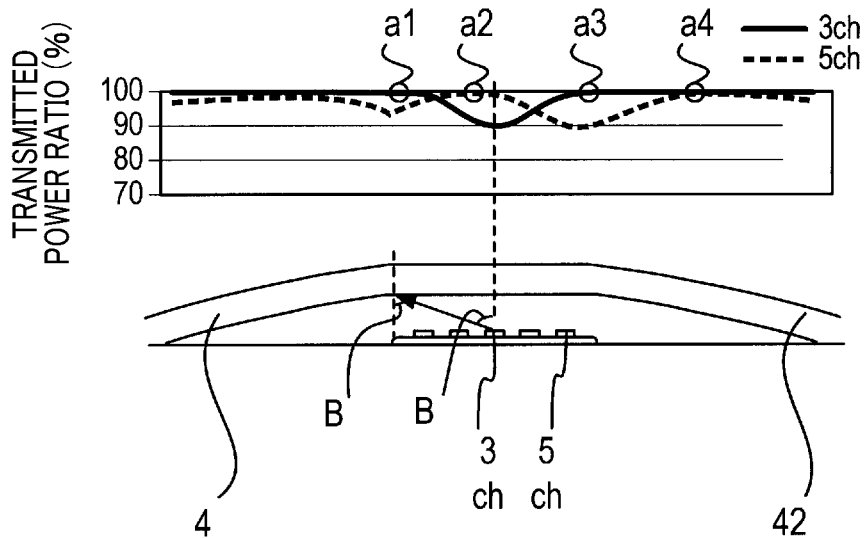
FIG. 6 is a diagram showing theoretically calculated transmittance in a cover part shown in an embodiment.

The transmitted power ratio corresponding to the transmittance theoretically calculated at each position in the antenna cross-section of a conventional cover part and a cover part of the present embodiment is shown in FIGS. 5 and 6.

As shown in FIG. 5, when the shape of the cover part is rectangular, the transmitted power ratio is 100% at each of the positions a1 to a4 where the incidence angle of the radar waves entering the cover part from each of the channel 3 (ch3) antenna and the channel 5 (ch5) antenna is the Brewster angle B. However, at each position outside of positions a1 to a4, in other words, at a position farther from the antenna radiating radar waves than positions a1 to a4, the incidence angle is larger than the Brewster angle B. For this reason, the transmitted power ratio of the radiated radar waves is reduced, and there are points where the transmitted power ratio is below 90%.

On the other hand, as shown in FIG. 6, the transparent part 42 of the cover part 4 of the present embodiment has a curved surface shape at a position where an angle with respect to the antenna center plane is larger than the Brewster angle B in the cover inner surface. The curved surface shape is a shape such that the incidence angle of the radar waves radiated from the antenna center becomes the Brewster angle B.

Thereby, the incidence angle is smaller than that of a cover part with a rectangular shape. Therefore, the transmitted power ratio does not fall below 90%. That is, according to the present embodiment, it is possible to suppress decrease in the transmitted power ratio.

Figure 7:
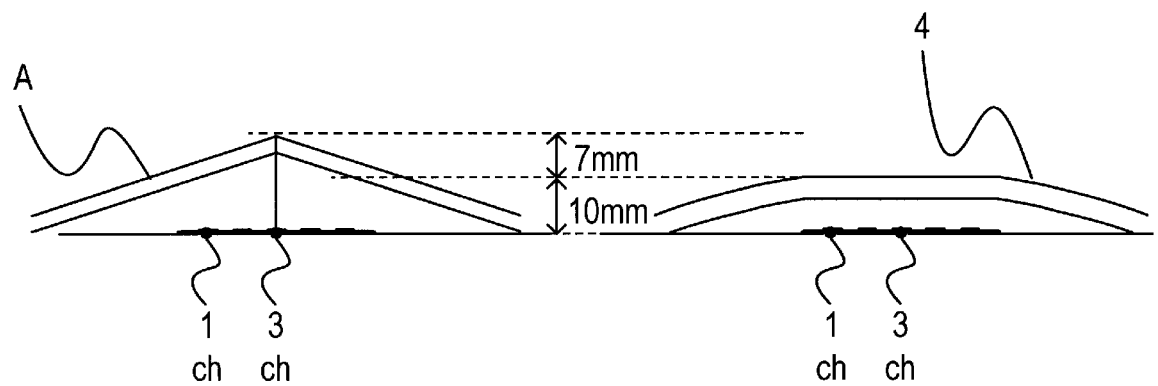
FIG. 7 is a view showing structures of a conventional cover part and a cover part of the embodiment.

(2) According to the radar system 1 of the present embodiment, the size can be reduced as compared to a conventional pyramidal cover part A. That is, as shown in FIG. 7, in the case of the conventional pyramidal cover part A, the top portion needs to be made high to separate the top portion one wavelength further apart from the antenna surface 33 in order to make a phase difference between the received radar waves and the radar waves reflected by the cover part A. However, this is not necessary in the present embodiment, and the size of the radar system can be reduced.

Figure 8:
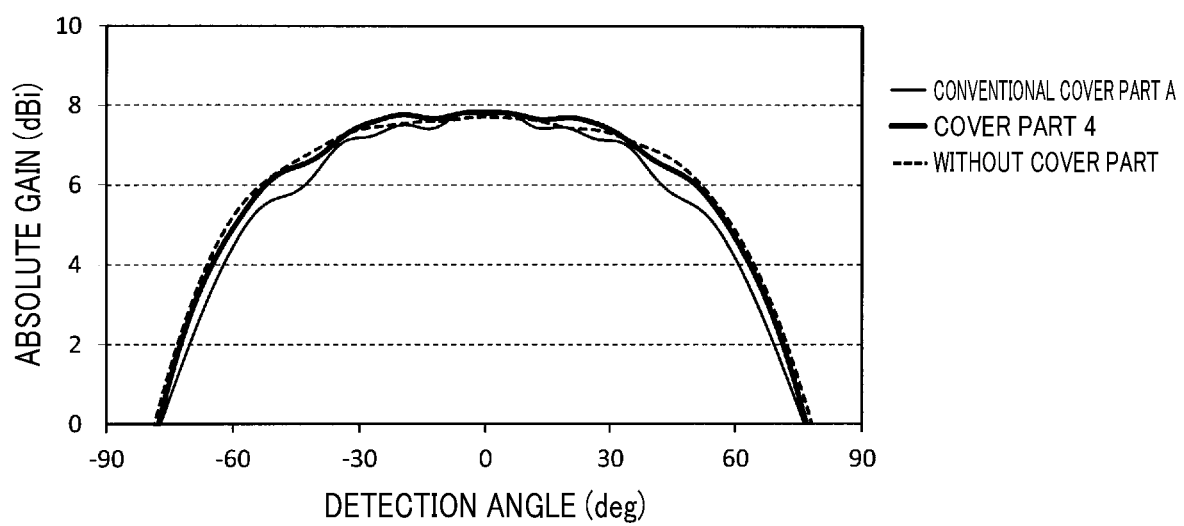
FIG. 8 is a graph showing absolute gain with respect to detection angle in each of a channel 3 (ch3) antenna with a conventional cover part, one with a cover part shown in the embodiment and one without a cover part.
Figure 9:
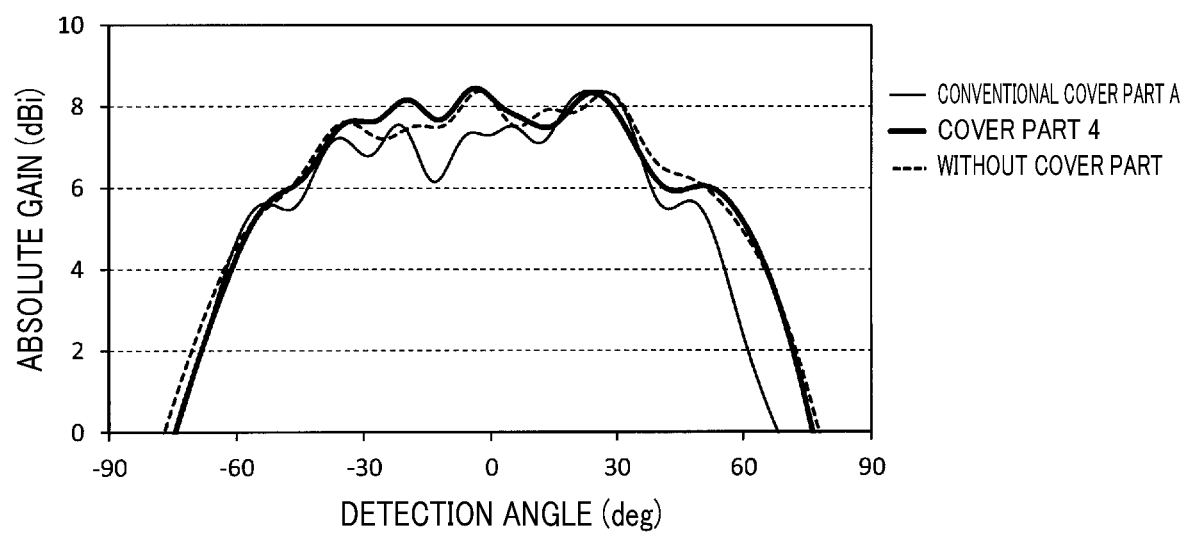
FIG. 9 is a graph showing absolute gain with respect to detection angle in each of a channel 1 (ch1) antenna with a conventional cover part, one with a cover part shown in the embodiment and one without a cover part.

(3) According to the present embodiment, absolute gain is improved as compared to a conventional pyramidal cover part A. That is, loss in gain caused by providing a cover part can be suppressed as compared to the conventional pyramidal cover part A. As shown in FIG. 8, the absolute gain in the ch3 antenna which is a unit antenna 341 at the center of the array antenna 34 is improved. Moreover, as shown in FIG. 9, the absolute gain was also improved in the radar waves radiated from the ch1 antenna which is a unit antenna 341 at the end of the array antenna 34. That is, a reduction of the absolute gain at a null point was improved. Further, the null point as used herein refers to a point where a reduction in absolute gain generates by cancellation of radar waves. Moreover, the absolute gain was particularly improved in a range where the detection angle was 30° or more, that is, at a position where the incidence angle became large.

Figure 10:
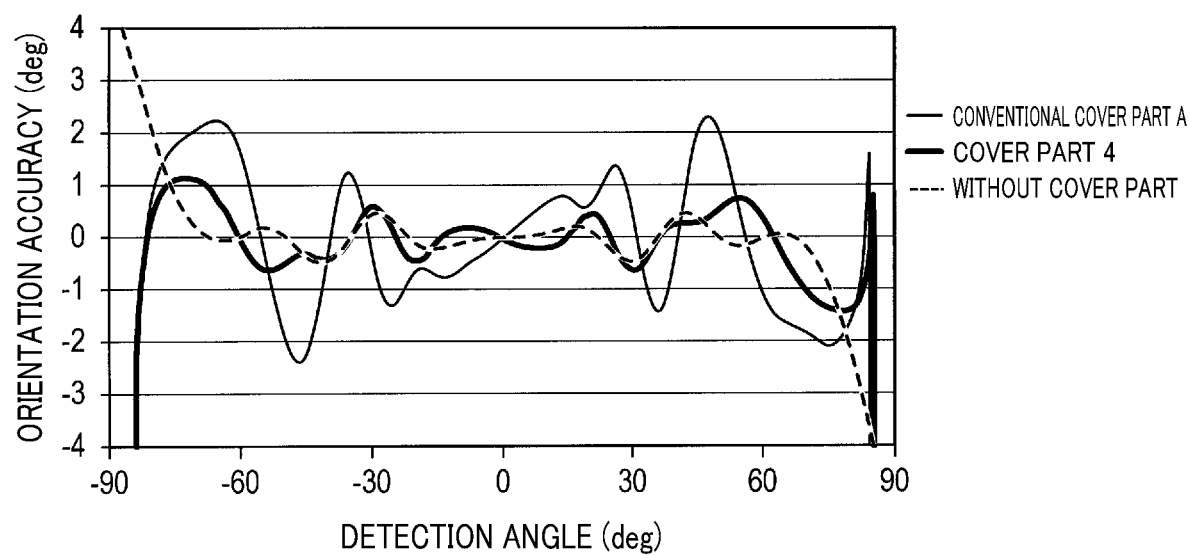
FIG. 10 is a graph showing orientation accuracy with respect to detection angle in each antenna with a conventional cover part, one with a cover part shown in the embodiment and one without a cover part.

(4) According to the radar system 1 of the present embodiment, the orientation accuracy is improved. The term "orientation accuracy" as used herein refers to an accuracy with respect to a deviation between an orientation that should be essentially detected and an orientation that is actually measured. That is, as shown in FIG. 10, when the orientation accuracy for each detection angle with respect to the radar waves is compared, in the case where the cover part 4 of the present embodiment is used, the variation in the orientation accuracy is smaller as compared to the case where a conventional cover part is used.

2. Other Embodiments

Although the embodiment of the present disclosure has been described above, the present disclosure is not limited to the embodiment mentioned above and can be exploited in various modifications.

Figure 11:
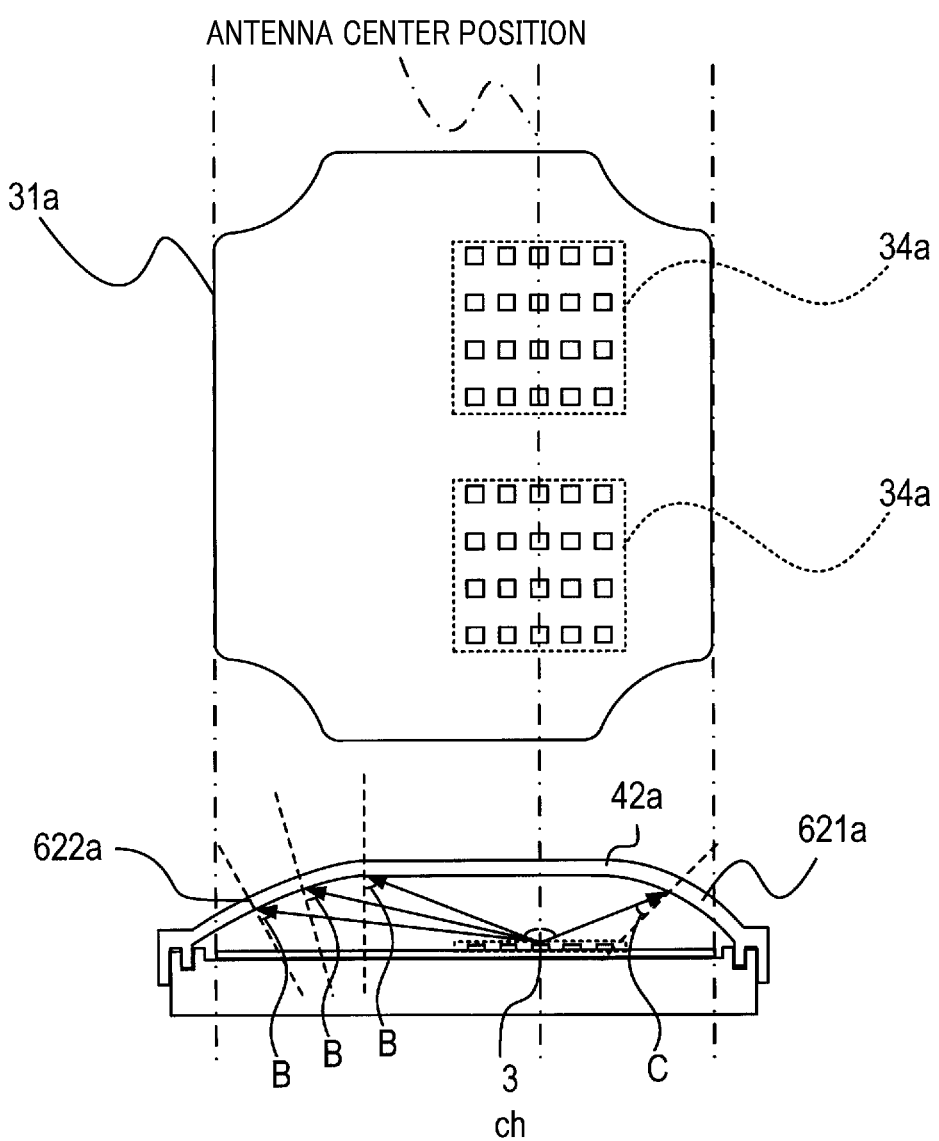
FIG. 11 is a view showing a structure of a radar system in a modification example.

(1) In the present embodiment, two array antennas 34 are formed at the center of the antenna substrate 31 in the short side direction, but the positions where the two array antennas 34 are formed are not limited to the center position of the antenna substrate 31 in the short side direction. For example, as shown in FIG. 11, the positions where the two array antennas 34a are formed may be deviated from the center position of the antenna substrate 31a in the short side direction.

Moreover, in such a case, the shape of the transparent part 42a may be as follows. That is, the transparent part 42a may have a shape where the incidence angle of the radar waves relative to the adjustment part 621a is an angle C that is equal to or less than the Brewster angle B, in which the adjustment part 621a is located in a direction where with respect to the antenna center plane as a boundary, the antenna center plane is deviated with respect to the antenna substrate 31a. Moreover, the transparent part 42a may also have a shape where the incidence angle of the radar waves relative to the adjustment part 622a is the Brewster angle B, in which the adjustment part 622a is located on a side opposite to the direction where the antenna center plane is deviated with respect to the antenna substrate 31.

(2) In the present embodiment, the adjustment angle is set to be the Brewster angle B. However, the adjustment angle is not limited to the Brewster angle B. For example, similarly to the adjustment part 62, the central portion of the transparent part 42 may be of a shape such that the incidence angle at an arbitrary point in the xz-plane passing through the arbitrary point on the cover inner surface is the Brewster angle B. However, the front direction seen from the antenna center, that is, a point where the normal line to the antenna surface 33 at the antenna center intersects the inner surface of the cover part becomes discontinuous, and therefore the incidence angle at the point does not have to be the Brewster angle B.

Figure 12:
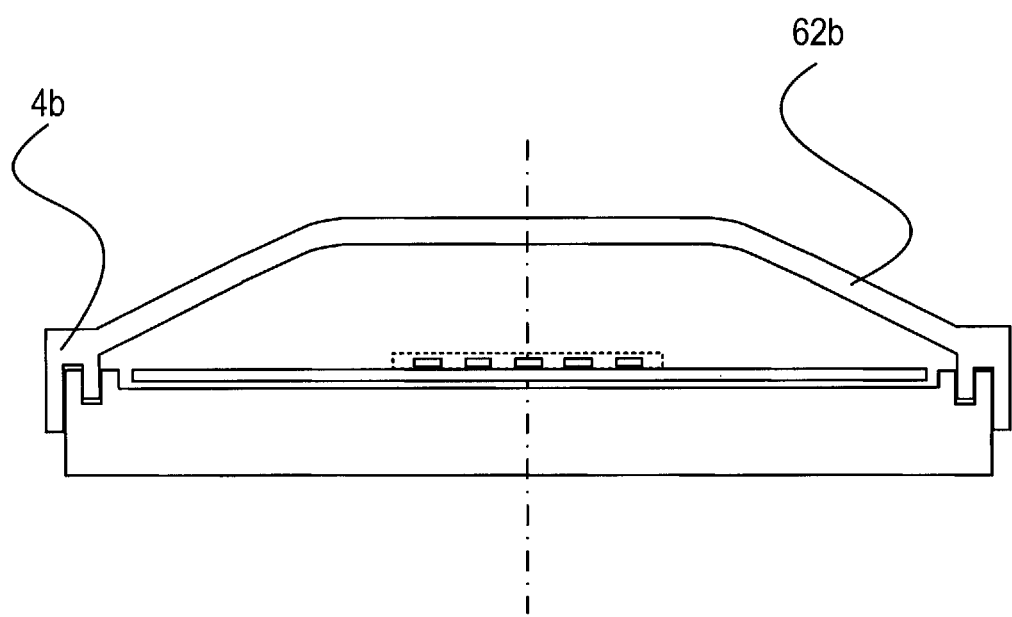
FIG. 12 is a view showing a structure of a radar system in a modified example.

(3) Moreover, in the present embodiment, the shape of the adjustment part 62 is a curved surface shape, but the shape of the adjustment part 62 is not limited to this. For example, as shown in FIG. 12, the shape of the adjustment part 62a may be a planar shape such that the incidence angle of the radar waves entering from the ch3 antenna in the adjustment part 62a is equal to or less than the Brewster angle B throughout the entire range. In the case of such a shape, it is not necessary to process the cover part 4a into a curved surface, and, for example, the manufacturing cost for processing into a curved surface can be suppressed.

(4) A plurality of functions that one component has in the embodiment mentioned above may be implemented by a plurality of components, and a function that one component has may be realized by a plurality of components. Moreover, a plurality of functions that a plurality of components have may be realized by one component, and one function that can be realized by a plurality of components may be realized by one component. Moreover, a portion of the configuration of the embodiment mentioned above may be omitted. Moreover, at least a portion of the configuration of the embodiment mentioned above may be added to or substituted for the configuration of another embodiment mentioned above. Further, all aspects contained in the technical idea that can be specified from the language recited in the claims are embodiments of the present disclosure.

What is claimed is:

1. A radar system that detects an object using radar waves, the radar system comprising:
    an antenna surface that is provided with at least one array antenna arranged on a collinear arrangement straight line; and
    a cover part that covers a front of an antenna of the array antenna, wherein the front of the antenna is a side away from which the radar waves are radiated with respect to the antenna surface as a boundary, wherein
    each of the at least one array antenna includes at least one unit antenna, wherein a plurality of antenna elements that radiate the radar waves of the same phase are arranged in the same direction as the arrangement straight line,
    the at least one unit antenna is arranged in a direction perpendicular to the arrangement straight line along the antenna surface,
    an imaginary plane that is on the same plane as the arrangement straight line and is perpendicular to the antenna surface is set to be an antenna center plane,
    in an antenna cross-section that is a plane perpendicular to the antenna center plane, the position where the antenna center plane intersects the antenna surface is set to be an antenna center, an arbitrary point on a cover inner surface that is a surface of the cover part facing the antenna surface, which is a point of incidence of the radar waves, is set to be an incidence point, and an angle at the incidence point between a normal line to the cover inner surface at the incidence point and an imaginary line connecting the incidence point and the antenna center is set to be an incidence angle, and
    the cover part includes an adjustment part, which is a part of the cover part that is in a range equal to or more than an adjustment angle, the adjustment angle comprising a predetermined angle between the antenna center plane and an imaginary line connecting the incidence point and the antenna center in the antenna cross-section, and
    in the adjustment part, the incidence angle at the incidence point on the cover inner surface is equal to or less than a Brewster angle based on a relationship between the incidence angle and a reflectance of horizontally polarized waves of the radar waves.

2. The radar system according to claim 1, wherein:
    in the antenna cross-section,
    the shape of the adjustment part is a shape where the incidence angle at an arbitrary incidence point of the adjustment part is the Brewster angle.

3. The radar system according to claim 2, wherein:
    the adjustment angle is the Brewster angle;
    the cover part includes a parallel part that is a part of the cover part that is in a range of equal to or less than the adjustment angle; and
    in the parallel part, the cover inner surface is parallel to the antenna surface.

4. The radar system according to claim 1, wherein:
    a cover thickness that is a thickness of the cover part is configured to be homogeneous and to be half of the effective wavelength of the radar waves.

5. The radar system according to claim 2, wherein:
a cover thickness that is a thickness of the cover part is configured to be homogeneous and to be half of the effective wavelength of the radar waves.
6. The radar system according to claim 3, wherein:
a cover thickness that is a thickness of the cover part is configured to be homogeneous and to be half of the effective wavelength of the radar waves.

\* \* \* \* \*